Figure 4:
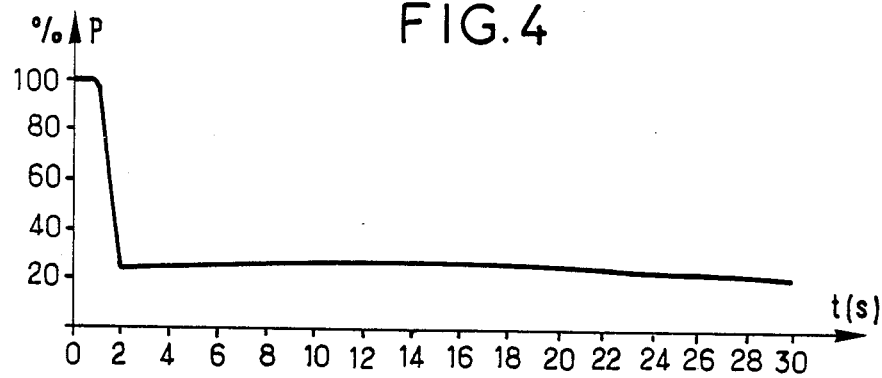

United States Patent [19]

Bourin et al.

[11] Patent Number: 4,842,805
[45] Date of Patent: Jun. 27, 1989

[54] METHOD OF DETECTING THAT AN ANTI-REACTIVE ELEMENT HAS FALLEN INTO THE REACTOR OF A NUCLEAR POWER STATION, AND A POWER STATION PROTECTED AGAINST SUCH A FALL

[75] Inventors: Jean-Michael Bourin, Paris; Michel Bruyère, Evecquemont; Isaac Rousseau, Paris, all of France

[73] Assignee: Framatome, France

[21] Appl. No.: 156,672

[22] Filed: Feb. 17, 1988

[30] Foreign Application Priority Data

Feb. 20, 1987 [FR] France ................................ 8702222

[51] Int. Cl.$^4$ .............................................. G21C 7/36
[52] U.S. Cl. .................................... 376/215; 376/216; 376/219
[58] Field of Search ...................... 376/215, 216, 219

[56] References Cited

U.S. PATENT DOCUMENTS

| | | | |
|---|---|---|---|
| 4,075,059 | 2/1978 | Bruno | 376/216 |
| 4,253,093 | 2/1981 | Johanson et al. | 340/606 |
| 4,399,095 | 8/1983 | Morris | 376/216 |
| 4,548,784 | 10/1985 | Watari | 376/216 |
| 4,699,749 | 10/1987 | McAtee | 376/216 |
| 4,716,009 | 12/1987 | Thaulez | 376/242 |

FOREIGN PATENT DOCUMENTS 1094698 1/1981 Canada .

*Primary Examiner*—Donald P. Walsh
*Attorney, Agent, or Firm*—Sughrue, Mion, Zinn, Macpeak & Seas

[57] ABSTRACT

The invention improves detecting that a control cluster has fallen into the reactor of a nuclear fission power station. Variations are monitored firstly in the nuclear power (3) and secondly in at least one parameter (1, 2) external to the reactor and having an influence on reactor control. A cluster is considered as having fallen when a rapid drop (12j) is detected in said power while no variation (12a, 12b, . . . 12h) is simultaneously detected in an external parameter that could have given rise to said power drop.

Application to producing electricity.

7 Claims, 6 Drawing Sheets

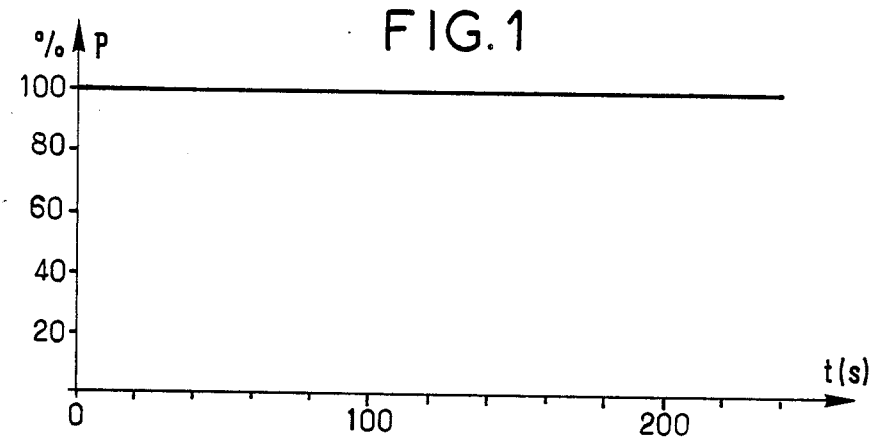
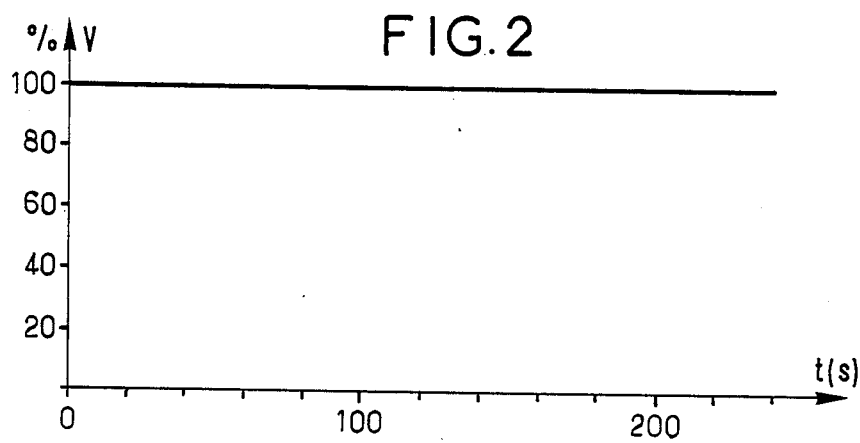
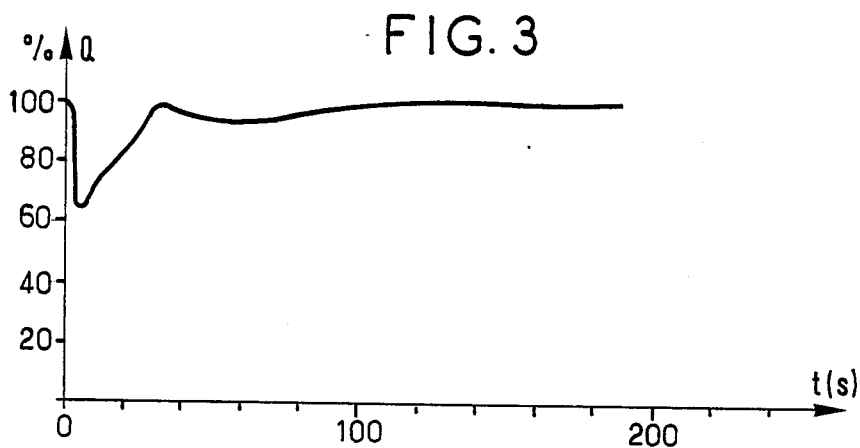

METHOD OF DETECTING THAT AN ANTI-REACTIVE ELEMENT HAS FALLEN INTO THE REACTOR OF A NUCLEAR POWER STATION, AND A POWER STATION PROTECTED AGAINST SUCH A FALL

The present invention relates to detecting when antireactive elements, i.e. neutron-absorbing elements, fall into the core of the reactor in a nuclear fission power station.

The invention is more particularly applicable to the case where the fall to be detected is the fall of one of the "control clusters" which are used for regulating and controlling the nuclear power, i.e. the power generated by the reaction. Such clusters are distributed over the horizontal section of the core. They are moved vertically in both directions under the control of an appropriate mechanism situated above the core so as to cause their absorbant rods to penetrate to a greater or lesser extent into the core.

For safety reasons, position detectors are disposed to indicate the position of each cluster at any moment. Unfortunately, these detectors can only be situated, in practice, facing the suspension elements to which the clusters are attached, and not actually facing the clusters themselves. An attachment defect can therefore cause a cluster to fall accidentally without said fall being indicated by said detectors.

Such a fall gives rise to a local drop in nuclear power, and thus to a drop in the overall power of the core. The presence of a power-regulating loop means that said drop is rapidly compensated by other control clusters being raised. However, in addition to other drawbacks, there then appears a distortion in the neutron flux which slows down combustion of the fuel elements in the vicinity of the fallen cluster and accelerates combustion in the other fuel elements. In addition, the scope of possible action which can be taken on the reaction is reduced. This is the main reason why it is desirable to detect when such accidental falls occur as quickly and as reliably as possible so as to perform an emergency stop on the reactor and then re-establish normal operation.

In prior power stations this detection is performed by detection means which are used simultaneously for other types of accident. More precisely, these means detect the excessive temperatures caused by the appearance of steam pockets at various points in the core along the component rods of the fuel elements. When a cluster has fallen accidentally, the first time the nuclear power rises to a certain level after said fall such an excess temperature or steam pocket appears along a fuel element whose combustion has been accelerated by the flux distortion. Different automatic protection means then give rise to an emergency reactor stop. The cause of this stop is then determined and the consequences of the accident are repaired before the reactor is put back into service.

This has the drawback, particularly if the anti-reactivity of the fallen cluster is relatively low, that a fairly long period of time may elapse before the nuclear power is raised high enough to trigger the above-described stop procedure. The combustion rate of some of the fuel elements can then be very different from the norm.

A particular aim of the present invention is to provide more rapid and more certain detection of the fall of an anti-reactive element such as a control cluster, even when a fallen cluster gives rise to only a small variation in the nuclear power by virtue of its position and/or by virtue of its low anti-reactivity. Another aim of the invention, by virtue of such detection, is to provide better protection for the reactor of a power station against the damaging consequences of continuing the nuclear reaction in normal service after such a fall.

The invention also aims at achieving these results in a simple, and cheap manner which avoids unfavorable secondary effects, an in particular which avoids unnecessary emergency stops of the reactor in the power station.

To satisfy these aims, the present invention provides, in particular a method of detecting the fall of an anti-reactive element into the reactor of a nuclear power station, said method being characterized by the fact that variations are monitored firstly in the nuclear power of the reactor under the control of a loop for regulating said power and secondly of at least one external parameter related to events outside the reactor and used in calculating the power reference value which is supplied to said regulation loop in order to control the reactor, said fall being detected by the fact that a rapid drop in said power is detected while no large external parameter variation is detected with a predetermined time relationship to said rapid drop.

Naturally, such a time relationship must be adapted to each of the external parameters that is selected for monitoring. The time relationship is chosen so as to show that the drop in nuclear power is the result of a variation in the external parameter. The term "result" is used to cover both the case where it is directly caused by said variation, and the case where it is caused by the same original cause as said variation. The appropriate time relationship is often simply that the time interval between the two events should be less than a predetermined value.

It will also be understood that the words "rapid" and "large" have a quantitative meaning herein which depends on the power station to which the invention is applied: a drop in power is said, herein, to be "rapid" if it falls within the range of power drop rates which follow the accidental falls that are to be detected. A variation in an external parameter is said to be "large" if the rapidity and/or the amplitude thereof make it capable of giving rise to such a rapid drop in the nuclear power.

Further, it must be understood that the above-mentioned reference power value may itself be used as an external parameter in accordance with the invention, since it is representative of the external parameters from which it is derived.

The present invention also provides a nuclear power station having a reactor protected against the fall of an anti-reactive element, said reactor comprising:

a core containing fissile fuel elements for maintaining a nuclear reaction providing nuclear power;

a cooling fluid circuit having a branch passing through said core to remove said power in the form of heat and to enable said heat to be utilized outside the reactor;

measurement means for continuously measuring the current nuclear power of the reactor;

anti-reactive regulation elements suitable for reversibly reducing said power; and regulation drive means controlled by said power measurement means in order to cause said regulation elements to penetrate to a greater or lesser extent into said core depending on whether the current nuclear power is greater than or less than a power reference value, in such a manner as to constitute a nuclear power regulation loop and to enable the reactor to be controlled by varying said reference value, with any reaction of said loop giving rise to transient power variations before settling if possible;

at least one anti-reactive element being suspended above a passage into said core such that an accidental fall of said element causes it to penetrate into the core, thereby initiating a rapid decrease in nuclear power, followed by a reaction from said regulation loop, which reaction is accompanied by transient variations in said power prior to said power settling back on its value prior to said fall;

said reactor further including stop means under the control of a reactor stop signal; and accident detection means for providing such a reactor stop signal after an accident in the core, in particular such a fall of an anti-reactive element, and thus for protecting the reactor against the damage which would result if said reaction were to continue without the accident being repaired;

said power station further including:

a power outlet member receiving inlet thermal power from another branch of said cooling fluid circuit and providing variable and/or interruptible outlet power to a load; and at least one nuclear power regulating system receiving the values of parameters external to the reactor such as parameters relating to the operation of said power outlet member, and generating said power reference value in response thereto in order to continuously match the current nuclear power to variations in said parameters so that if such a variation is large it is capable of causing a rapid variation in nuclear power;

said power station being characterized by the fact that said accident detection means comprise a circuit specifically for detecting the fall of an anti-reactive element, said circuit being suitable for detecting firstly rapid drops in nuclear power and secondly said large variations in at least one said external parameter, and for providing a said reactor stop signal when such a drop in nuclear power is detected with no such external parameter variation in a predetermined time relationship with said drop.

It appears in the context of the present invention that the rapid power drop phenomenon which accompanies such an accidental fall can be used for reliably detecting such a fall provided solely that, when such a power drop is detected, it is possible to establish whether or not it constitutes a part of the transient variations in power which accompany any large variation in an external parameter.

More precisely, such knowledge makes it possible to trigger a stop on the basis of a power drop rate threshold which is sufficiently low to ensure that any dangerous fall of an anti-reactive element gives rise to such a stop even if the element in question has relatively low anti-reactivity. This knowledge makes it possible to eliminate the danger which accompanies the selection of such a low threshold, which danger is that relatively large variations in external parameters will give rise to pointless emergency stops which are damaging to exploitation of the power station.

This knowledge is made possible by the fact that it is possible to establish simply and with a limited margin of error the time relationships which exist between large easily-detected variations in certain external parameters, and the rapid drops in nuclear power that these variations may give rise to.

Preferably, in accordance with the present invention, the following additional dispositions are also adopted:

Said circuit for detecting a fall comprises:

a nuclear power monitoring circuit comprising differentiating means receiving a measurement signal representative of said power and delivering a derivative signal which is differentiated with respect to time; and threshold means receiving said derivative signal and delivering a signal representative of a rapid drop in nuclear power when said power drops at a rate greater than a predetermined rate;

at least one external parameter monitoring circuit, each such circuit including differentiator means receiving a measurement signal representative of such a parameter and delivering a derivative signal; and threshold means receiving the, or each, said derivative signal and providing a signal representative of large variation in an external parameter when any such derivative signal leaves a predetermined range; and a logic circuit having its inputs connected to said monitoring circuits in order to provide said reactor stop signal on receiving a signal representative of a rapid drop in nuclear power without receiving a signal representative of a large variation in an external parameter.

Said circuit for detecting a fall comprises a plurality of said circuits for monitoring external parameters each detecting variations in a corresponding external parameter, said logic circuit comprising means for logically adding the output signals from said monitoring circuits.

Said circuit for detecting a fall comprises at least one delay means for delaying the measurement signal or a signal derived from the measurement signal of at least one of said external parameters in order to provide at least one signal representative of a large variation in an external parameter which signal is delayed relative to another non-delayed signal representative of a large variation in the same parameter;

said logic circuit providing said reactor stop signal when said signal representative of a rapid drop in the current nuclear power is present and none of said delayed and nondelayed signals representative of a large variation in an external parameter is simultaneously present.

The above disposition makes it possible to take account of a possible time lapse between a variation in an external parameter and some of the nuclear power drop stages which are caused by said variation.

The invention is particularly applicable to well known PWR type power stations having the following dispositions:

said cooling fluid circuit includes cooling loops each of which comprises a primary pressurized water circuit and a secondary water and steam circuit, the primary circuit cooling said core, the secondary circuit including at condenser and a steam generator heated by said primary circuit, each of said circuits including a pump for circulating water;

said means for measuring nuclear power are chambers sensitive to neutron flux and disposed in said core;

said anti-reactive regulation elements are control clusters each comprising a plurality of vertically-suspended rods that penetrate to a greater or lesser extent into passages in said core, each of said cluster simultaneously constituting one of said anti-reactive elements capable of suffering an accidental fall;

said power outlet member comprising at least one steam turbine driven by the steam from at least one of said secondary cooling fluid circuits and driving an alternator;

said load being an electricity supply grid fed from said alternator;

control means being provided on said cooling fluid secondary circuit to control the steam pressure at the inlet to the turbine as a function of the turbine speed and/or the electrical conditions at the alternator outlet, in such a manner as to constitute a regulation loop for the turbine-alternator assembly; and circuit breaking means are provided to isolate the alternator from the grid in the event of a grid fault or when necessary for power station operation.

Conventionally, in such a power station:

the cooling fluid circuit comprises two to four cooling loops;

the means for measuring the nuclear power comprise measurement chambers installed along two orthogonal diameters of the core symmetrically relative to said diameters; and said accident detection means include, inter alia, means for detecting excessive temperatures and/or excessive steam in the core. (In accordance with the invention, the said means for detecting an accidental fall are provided in addition to said means for detecting excessive temperature and/or steam).

In such a power station, the present invention makes it possible firstly to stop the reactor reliably in the event of a control cluster falling, even if said cluster has relatively low anti-reactivity or if its position is such that it gives rise to a relatively low variation in nuclear power on falling. The invention also makes it possible, simultaneously, to avoid pointlessly stopping the reactor, in particular:

when the power station is voluntarily or automatically isolated from the grid;

when the grid suffers an electric fault requiring a rapid reaction from the power station but not requiring isolation; or when the turbine is tripped, i.e. when an automatic device turns off its steam feed because of an anomaly.

The present invention is still more applicable to the case where said pump for the primary cooling fluid circuit is driven by a motor fed with electricity from said alternator such that the speed of said pump varies with the speed of said alternator and said turbine. In such a case it seems advantageous for said circuit for detecting a fall to include two of said circuits for monitoring large variations in external parameter, one of said circuits detecting variations in steam pressure at the inlet to the turbine, and the other detecting variations in the speed of the pump in said primary circuit.

A non-limiting example of how the invention may be implemented is described below with reference to the accompanying diagrammatic figures. In this description, it should be considered that the disposition mentioned above as being preferred in accordance with the present invention are put into use. It should also be understood that the items described and shown may, without going beyond the scope of the invention, be replaced by other items providing the same technical functions.

FIGS. 1, 2, and 3 are curves showing variations in various magnitudes as a function of time expressed in seconds in the event of a control cluster dropping into the reactor of a nuclear power station; for example, in accordance with the invention, with these magnitudes may be respectively the steam pressure at the turbine inlet, the speed of the pump in the primary circuit of a reactor cooling loop, and the nuclear power delivered by the reactor.

Figure 5:
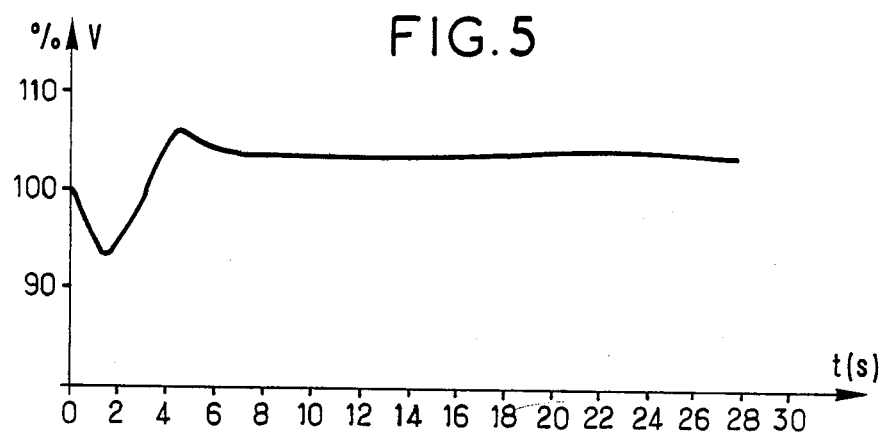
Figure 6:
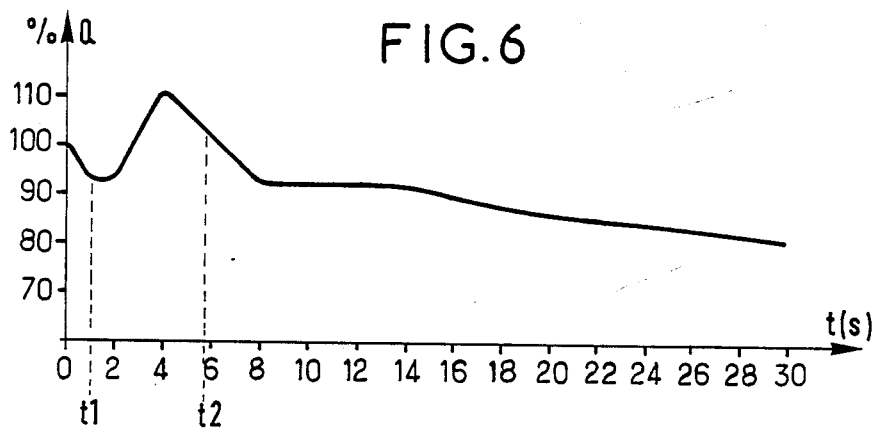

FIGS. 4, 5, and 6 are curves showing variations in the same magnitudes, respectively in the event of the power station being automatically isolated after a fault on the grid fed by the power station.

Figure 7:
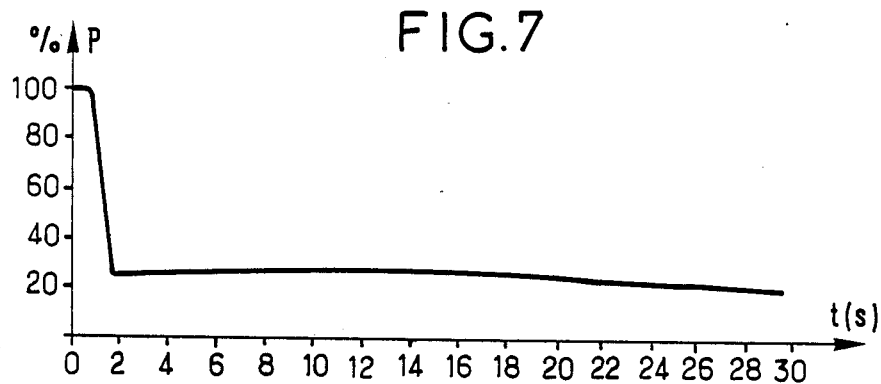
Figure 8:
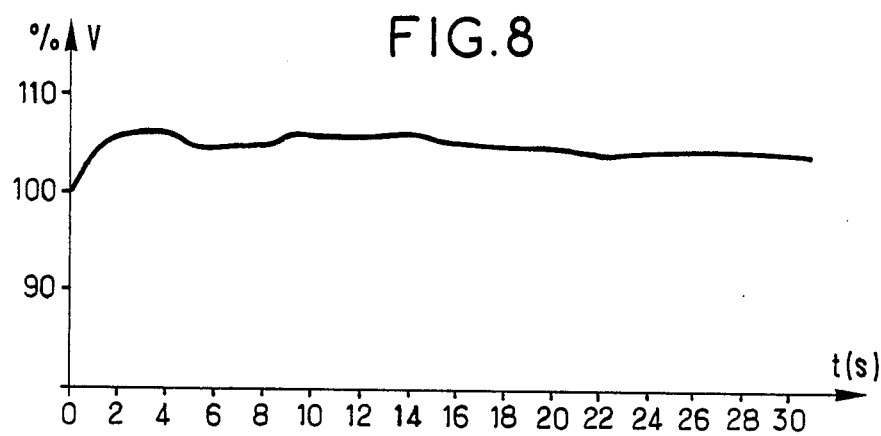
Figure 9:
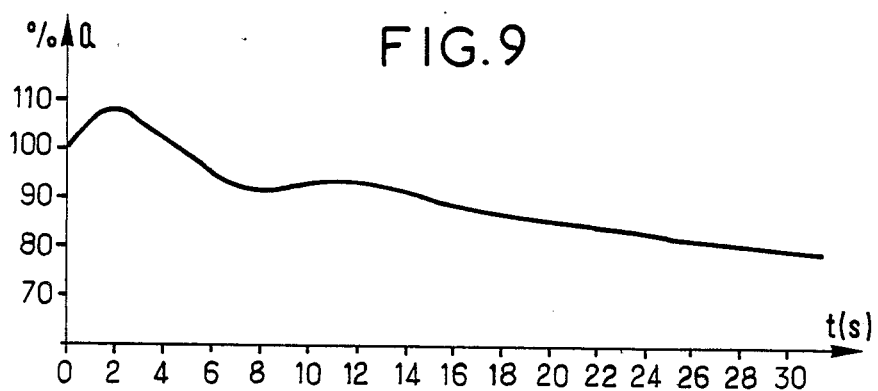

FIGS. 7, 8, and 9 are curves showing variations in the same magnitudes, respectively, in the event of the power station being isolated under the control of its operators without there being a fault on the grid.

Figure 10:
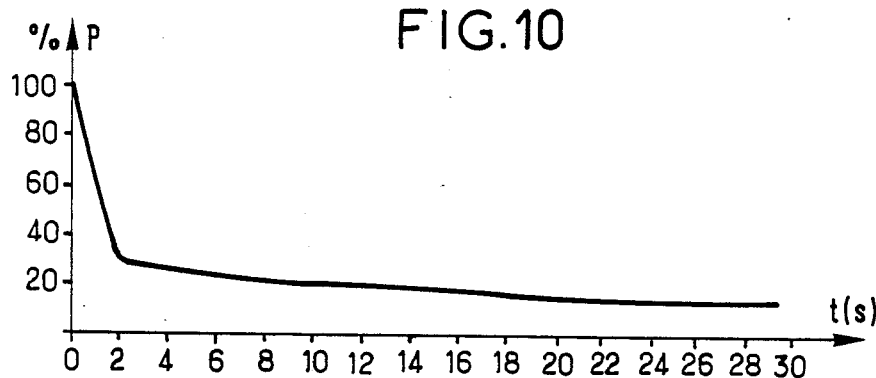
Figure 11:
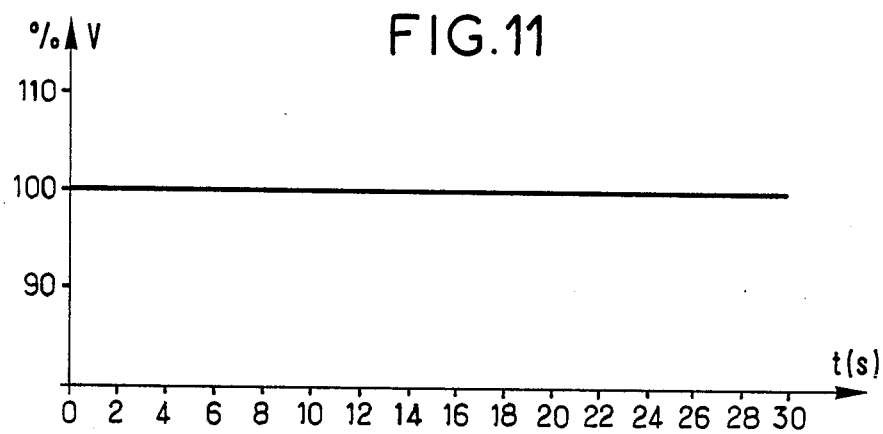
Figure 12:
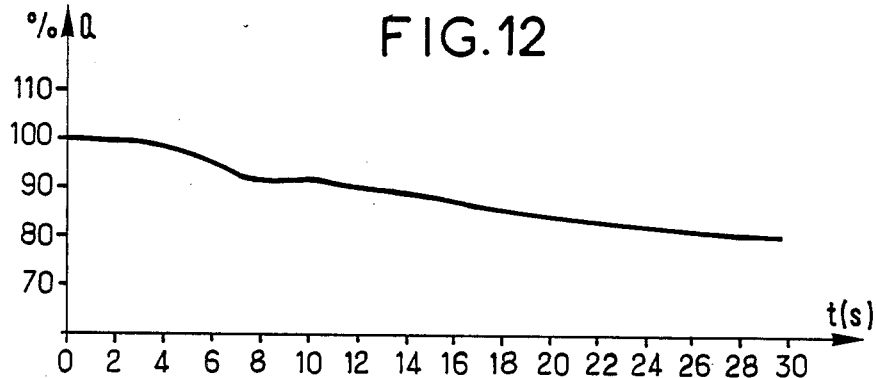

FIGS. 10, 11, and 12 are curves showing variations in the same magnitudes, respectively, in the event of a turbine in said power station being tripped out of service.

Figure 13:
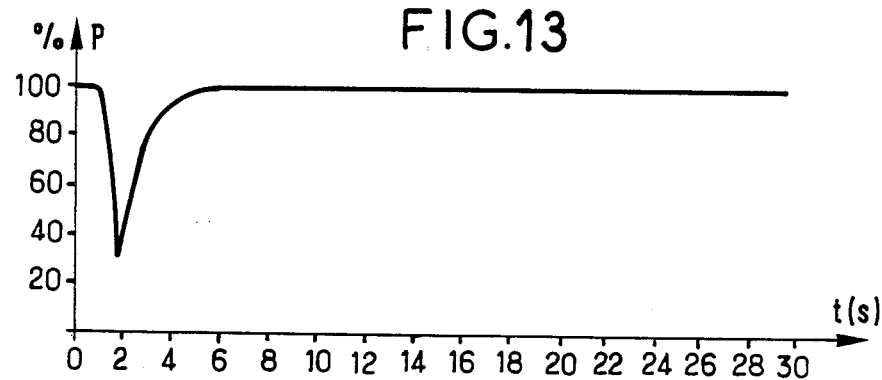
Figure 14:
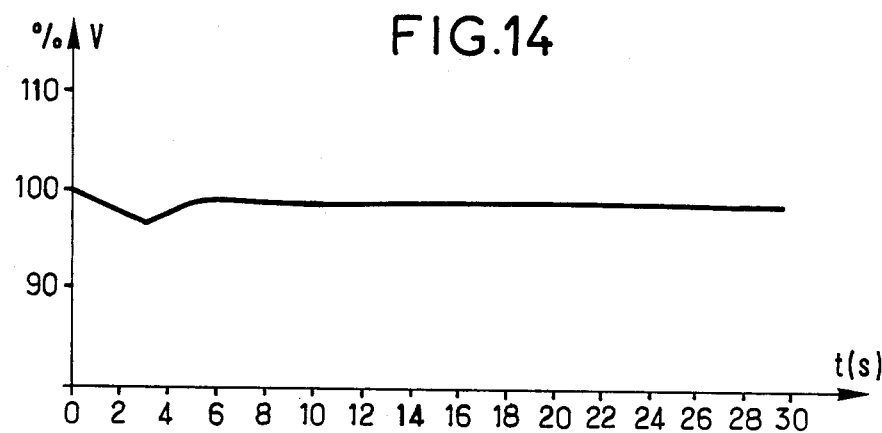
Figure 15:
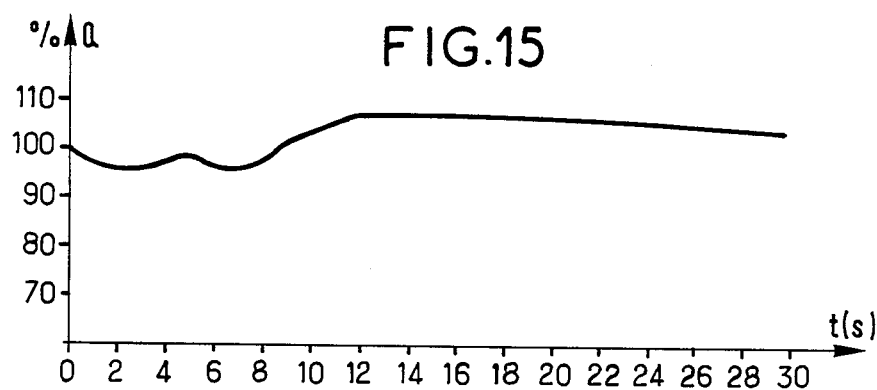

FIGS. 13, 14, and 15 are curves showing variations in the same magnitudes, respectively, in the event of a transient fault in the grid that does not require the power station to be isolated.

Figure 16:
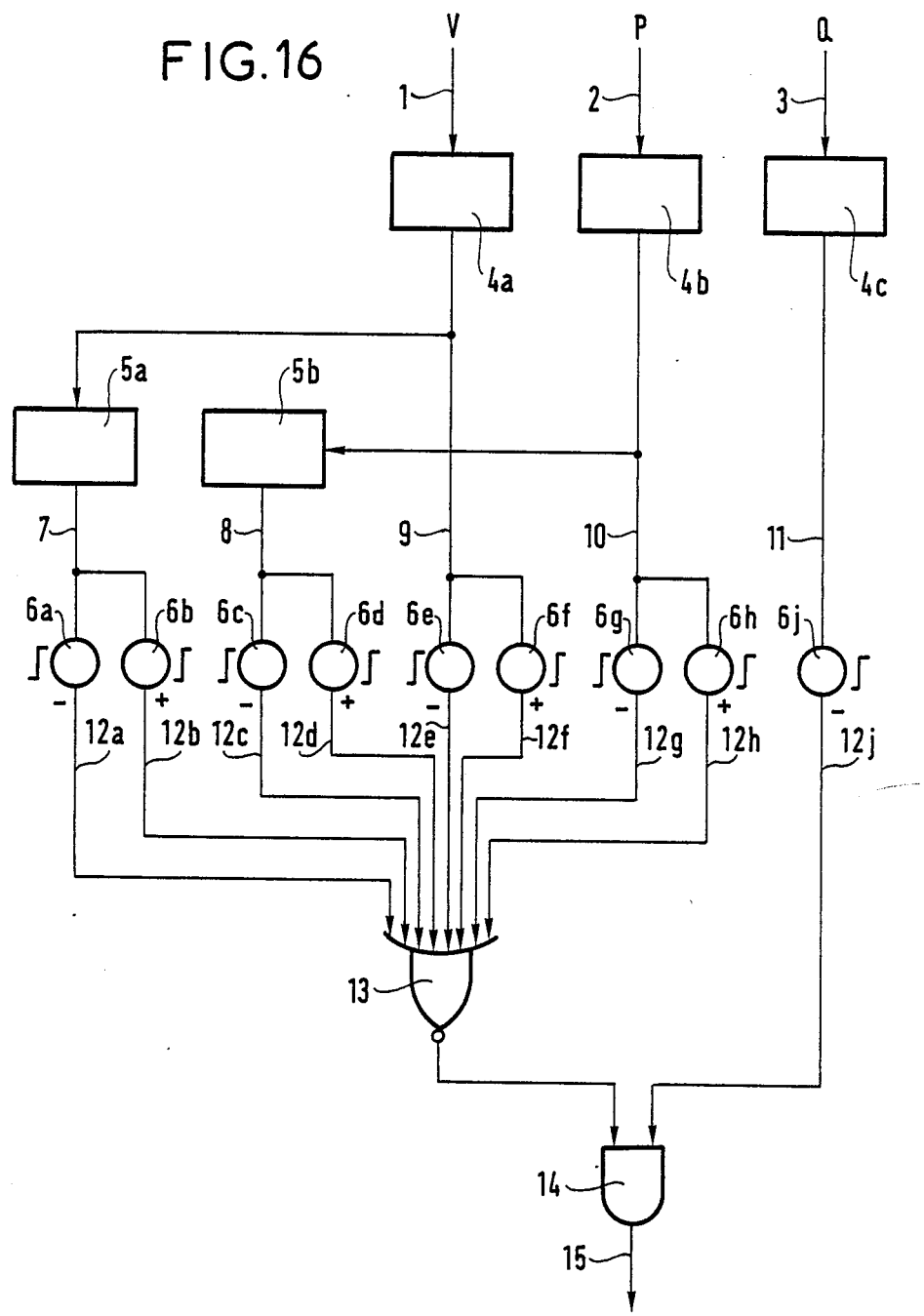

FIG. 16 is a block diagram of a circuit in accordance with the invention for detecting that an anti-reactive element has fallen.

FIGS. 1, 2, and 3 are curves of values measured when a control cluster falls, in which it can be seen that the steam pressure at the inlet to the turbine and the speed of the pumps do not vary, whereas the total nuclear power falls very rapidly and returns to its prior value after several tens of seconds.

The fall of a cluster is immediately observed by the measurement chambers in the form of a limited, but very rapid drop in the total power. A fallen cluster gives rise to a power drop which is restricted to a few fuel assemblies. This drop affects the total power for a period of a few seconds. Thereafter, the nuclear power regulation loop acts on the control clusters which have not fallen in order to return the total power to the reference value.

FIGS. 4, 5, and 6 show the variations in the same magnitudes as FIGS. 1, 2, and 3 but for a configuration of the power station which is referred to as "isolation after a grid fault" because this configuration is established automatically in the event of a fault appearing on the power distribution grid. The power demand on the boiler constituted by the nuclear reactor is then reduced to a low, non-zero level. This level is selected to be high enough, firstly to satisfy the power station's own requirements during the isolation period, and secondly to subsequently enable the station to return rapidly to the power level requested by the grid once the faults thereon have been cleared.

FIG. 4 shows a very rapid drop in steam pressure at the inlet to the turbine. This pressure drop causes the speed of the turbo-alternator set to vary and thus gives rise to small variations in the frequency of the electricity supplied. These frequency variations give rise to identical variations in the speed of the pumps in the primary cooling fluid circuits.

FIG. 5 shows that the systems for regulating the nuclear power of the reactor cause the positions of the control rods to vary in order to reduce said power. The variations in various parameters, and in particular in the speed of the pumps, prevent the nuclear power from dropping smoothly, and may even cause it to oscillate for several seconds about the original power value before dropping as shown in FIG. 6.

FIGS. 7, 8, and 9 show the variations in the same magnitudes when the station is isolated by its operators. The curves representing the speed of the pumps and the nuclear power are similar to those of FIGS. 4 and 5, except at the origin where the measured magnitudes do not decrease prior to oscillating.

FIGS. 10, 11, and 12 are the corresponding curves in the event of the turbine being tripped out of service without it being necessary to perform an emergency stop. The inlet pressure to the turbine begins by dropping rapidly, and then falls off more slowly (FIG. 10). The speed of the primary pumps remains constant and the nuclear power decreases slowly (FIG. 12).

FIGS. 13, 14, and 15 are the corresponding curves in the event of a transient grid fault which is cleared very quickly and which does not justify isolating the power station. The inlet pressure to the turbine drops very quickly (FIG. 13) as for power station isolation, but then returns very quickly to its original value. The pump speed drops slightly before returning to its initial value (FIG. 14). The nuclear power begins by dropping smoothly like the pump speed, and then oscillates prior to returning to its initial value (FIG. 15).

FIGS. 1, 2, and 3 show that in the event of a control cluster falling, only the nuclear power varies, whereas in the other events (FIGS. 4 to 15) at least one of the other two external parameters shown varies in addition to the nuclear power varying. The variations in nuclear power may be so large as to give rise to an emergency stop of the reactor. In order to avoid the drawbacks of such an unwanted stop, the present invention teaches that the value of the derivative at each point on the curves should be calculated and that the calculated values should be compared with predetermined threshold values.

An emergency stop will be initiated if, and only if the nuclear power derivative signal reaches the corresponding threshold.

FIG. 16 is a block diagram of a circuit suitable for implementing the method in accordance with the invention.

Measurement signals are available representative of the speed of the primary pumps 1, of the steam pressure at the inlet to the turbine 2, and of the nuclear power 3. The signals 1 and 2 represent two parameters which are said to be "external" to the reactor. These three signals are applied to the inputs of three respective differentiator circuits 4a, 4b, and 4c which constitute the above-differentiating means.

The derivative signals 9 and 10 at the outlets from the circuits 4a and 4b are applied firstly to respective delay circuits 5a and 5b and secondly to respective pairs of threshold relays 6e & 6f and 6g & 6h. It will be understood that such relays constitute the threshold means mentioned above.

The delayed derivative signals 7 and 8 at the outputs from the circuits 5a and 5b are likewise applied to pairs of threshold relays 6a & 6b and 6c & 6d. The derivative signal 11 at the output from the differentiator circuit 4c is applied to a threshold relay 6j.

The threshold relays deliver respective signals having values 0 or 1. Each of the signals 7, 8, 9, and 10 is applied to a pair of threshold relays so as to detect excursions beyond a positive threshold (+) and a negative threshold (−), between which thresholds the signals are at zero. Each of the signals 12a, 12b, 12c, 12d, 12e, 12f, 12g, and 12h from the threshold relays is applied to an input to a logic NOR circuit 13. This circuit delivers a logical "1" output if, and only if none of its input signals is at 1. The output signal 12j from the threshold relay 6j is set to 1 when the signal 11 is below a negative threshold.

The output signal from the circuit 13 and the output signal from the threshold relay 6j are applied to respective inputs of an AND gate 14. When both input signals to the AND gate are in the "1" state, the output signal 15 is likewise in the "1" state and this signal is used as an emergency stop signal for the reactor. Given the durations of the various signals, it turns out that regardless of the instants at which the pump speed signal or the turbine inlet steam pressure signal vary within predetermined time limits, the variations in the derivations of these signals are taken into account by the threshold relays at the same instants that the nuclear power varies. For example, and with reference to FIG. 6, the signals 9, 10, and 11 are taken into account at instant t1, and the delayed signals 7 and 8 together with the signal 11 are taken into account at instant t2.

We claim:

1. A method of detecting the fall of an anti-reactive element into the reactor of a nuclear power station, said method being characterized by the fact that variations are monitored firstly in the nuclear power of the reactor under the control of a loop for regulating said power and secondly of at least one external parameter related to events outside the reactor and used in calculating the power reference value which is supplied to said regulation loop in order to control the reactor, said fall being detected by the fact that a rapid drop in said power is detected while no large external parameter variation is detected with a predetermined time relationship to said rapid drop.

2. A nuclear power station having a reactor protected against the fall of an anti-reactive element, said reactor comprising:

a core containing fissile fuel elements for maintaining a nuclear reaction providing nuclear power;

a cooling fluid circuit having a branch passing through said core to remove said power in the form of heat and to enable said heat to be utilized outside the reactor;

measurement means for continuously measuring the current nuclear power of the reactor;

anti-reactive regulation elements suitable for reversibly reducing said power; and regulation drive means controlled by said power measurement means in order to cause said regulation elements to penetrate to a greater or lesser extent into said core depending on whether the current nuclear power is greater than or less than a power reference value, in such a manner as to constitute a nuclear power regulation loop and to enable the reactor to be controlled by varying said reference value, with any reaction of said loop giving rise to transient power variations before settling if possible;

at least one anti-reactive element being suspended above a passage into said core such that an accidental fall of said element causes it to penetrate into the core, thereby initiating a rapid decrease in nuclear power, followed by a reaction from said regulation loop, which reaction is accompanied by transient variations in said power prior to said power settling back on its value prior to said fall;

said reactor further including stop means under the control of a reactor stop signal; and accident detection means for providing such a reactor stop signal after an accident in the core, in particular such a fall of an anti-reactive element, and thus for protecting the reactor against the damage which would result if said reaction were to continue without the accident being repaired;

said power station further including:

a power outlet member receiving inlet thermal power from another branch of said cooling fluid circuit and providing variable and/or interruptible outlet power to a load; and at least one nuclear power regulating system receiving the values of parameters external to the reactor such as parameters relating to the operation of said power outlet member, and generating said power reference value in response thereto in order to continuously match the current nuclear power to variations in said parameters so that if such a variation is large it is capable of causing a rapid variation in nuclear power;

said power station being characterized by the fact that said accident detection means comprise a circuit specifically for detecting the fall of an anti-reactive element, said circuit being suitable for detecting firstly rapid drops in nuclear power and secondly said large variations in at least one said external parameter, and for providing a said reactor stop signal (15) when such a drop in nuclear power is detected with no such external parameter variation in a predetermined time relationship with said drop.

3. A power station according to claim 2, characterized by the fact that said circuit for detecting a fall comprises:

a nuclear power monitoring circuit comprising differentiating means (4c) receiving a measurement signal representative of said power (3) and delivering a derivative signal (11) which is differentiated with respect to time; and threshold means (6j) receiving said derivative signal and delivering a signal (12j) representative of a rapid drop in nuclear power when said power drops at a rate greater than a predetermined rate;

at least one external parameter monitoring circuit, each such circuit including differentiator means (4a, 4b) receiving a measurement signal (1, 2) representative of such a parameter and delivering a derivative signal (9, 10); and threshold means (6e, 6f, 6g, 6h) receiving the, or each, said derivative signal and providing a signal (12e, 12f, 12g, 12h) representative of large variation in an external parameter when any such derivative signal leaves a predetermined range; and a logic circuit (13, 14) having its inputs connected to said monitoring circuits in order to provide said reactor stop signal (15) on receiving a signal representative of a rapid drop in nuclear power (optionally after a delay) without receiving a signal representative of a large variation in an external parameter (optionally after a delay).

4. A power station according to claim 3, characterized by the fact that said circuit for detecting a fall comprises a plurality of said circuits for monitoring external parameters (4a, 4b, 6e, 6f, 6g, 6h) each detecting variations in a corresponding external parameter.

said logic circuit (13, 14) comprising means (13) for logically adding the output signals from said monitoring circuits.

5. A power station according to claim 3 characterized by the fact that said circuit for detecting a fall comprises at least one delay means (5a, 5b) for delaying the measurement signal or a signal (9, 10) derived from the measurement signal (1, 2) of at least one of said external parameters in order to provide at least one signal (12a, 12b, 12c, 12d) representative of a large variation in an external parameter which signal is delayed relative to another non-delayed signal (12e, 12f/12g, 12h) representative of a large variation in the same parameter;

said logic circuit (13, 14) providing said reactor stop signal (15) when said signal representative of a rapid drop in the current nuclear power (12j) is present and none of said delayed and non-delayed signals representative of a large variation in an external parameter is simultaneously present.

6. A power station according to claim 4, wherein:

said cooling fluid circuit includes cooling loops each of which comprises a primary pressurized water circuit and a secondary water and steam circuit, the primary circuit cooling said core, the secondary circuit including at condenser and a steam generator heated by said primary circuit, each of said circuits including a pump for circulating water;

said means for measuring nuclear power are chambers sensitive to return flux and disposed in said core;

said anti-reactive regulation elements are control clusters each comprising a plurality of vertically-suspended rods that penetrate to a greater or lesser extent into passages in said core, each of said cluster simultaneously constituting one of said anti-reactive elements capable of suffering an accidental fall;

said power outlet member comprising at least one steam turbine driven by the steam from at least one of said secondary cooling fluid circuits and driving an alternator;

said load being an electricity supply grid fed from said alternator;

control means being provided on said cooling fluid secondary circuit to control the steam pressure at the inlet to the turbine as a function of the turbine speed and/or the electrical conditions at the alternator outlet, in such a manner as to constitute a regulation loop for the turbine-alternator assembly; and circuit breaking means are provided to isolate the alternator from the grid in the event of a grid fault or when necessary for power station operation.

7. A power station according to claim 6, wherein said pump for the primary cooling fluid circuit is driven by a motor fed with electricity from said alternator such that the speed of said pump varies with the speed of said alternator and said turbine;

said power station being characterized by the fact that said circuit for detecting a fall includes two of said circuits for monitoring large variations in external parameter, one of said circuits (4b, 6g, 6h) detecting variations in steam pressure at the inlet to the turbine, and the other (4a, 6e, 6f) detecting variations in the speed of the pump in said primary circuit.

* * * * *